United States Patent
Weiss

(10) Patent No.: US 10,136,291 B2
(45) Date of Patent: *Nov. 20, 2018

(54) LOW-POWER WIRELESS CONTENT COMMUNICATION BETWEEN DEVICES

(71) Applicant: Google LLC, Mountain View, CA (US)

(72) Inventor: Aaron Arthur Weiss, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,583

(22) Filed: Aug. 3, 2017

(65) Prior Publication Data

US 2017/0332191 A1  Nov. 16, 2017

Related U.S. Application Data

(63) Continuation of application No. 14/626,713, filed on Feb. 19, 2015, now Pat. No. 9,743,219.

(Continued)

(51) Int. Cl.
*H04W 4/80* (2018.01)
*H04B 1/3827* (2015.01)
(Continued)

(52) U.S. Cl.
CPC .............. *H04W 4/80* (2018.02); *H04B 1/385* (2013.01); *H04W 52/0229* (2013.01);
(Continued)

(58) Field of Classification Search
CPC ... H04W 4/80; H04W 4/008; H04W 52/0229; H04W 84/18; H04B 1/385
(Continued)

(56) References Cited

U.S. PATENT DOCUMENTS 6,014,085 A * 1/2000 Patel ................... H04L 63/1466
340/5.21
6,178,141 B1 * 1/2001 Duckworth ............. F41H 11/00
367/124

(Continued)

FOREIGN PATENT DOCUMENTS

WO     2014076527     5/2014

OTHER PUBLICATIONS

"Final Office Action", U.S. Appl. No. 14/626,713, dated Feb. 1, 2017, 13 pages.

(Continued)

*Primary Examiner* — Hai V Nguyen
(74) *Attorney, Agent, or Firm* — Colby Nipper

(57) ABSTRACT

Low-power wireless content communication techniques between devices are described. In one or more implementations, a method is described of controlling transfer of content to a wearable device from one or more computing devices over a lower power wireless communication connection. The method includes initiating a transfer of content to the wearable device over the lower power wireless communication connection to support playback of the content at the wearable device, in which the low power wireless communication connection does not support streaming of the content in an amount sufficient to support real time playback of the content at the wearable device. The transfer is managed of a plurality of portions of the content to the wearable device over the lower power wireless communication connection in which individual ones of the plurality of portions are transferred from the one or more computing device responsive to availability of the lower power wireless communication connection with the one or more computing devices. The plurality of portions of the content are caused to be stored locally at the wearable device.

20 Claims, 6 Drawing Sheets

Related U.S. Application Data

(60) Provisional application No. 62/097,478, filed on Dec. 29, 2014.

(51) Int. Cl.
  *H04W 52/02* (2009.01)
  *H04W 84/18* (2009.01)

(52) U.S. Cl.
  CPC ..... *H04W 84/18* (2013.01); *H04B 2001/3861* (2013.01); *Y02D 70/00* (2018.01); *Y02D 70/142* (2018.01); *Y02D 70/144* (2018.01); *Y02D 70/146* (2018.01); *Y02D 70/166* (2018.01); *Y02D 70/26* (2018.01); *Y02D 70/40* (2018.01)

(58) Field of Classification Search
  USPC ........................................................ 455/41.2
  See application file for complete search history.

(56) References Cited

U.S. PATENT DOCUMENTS

| | | | | |
|---|---|---|---|---|
| 6,435,737 B1* | 8/2002 | Wise | | G06F 9/3867 712/200 |
| 6,611,537 B1* | 8/2003 | Edens | | H04L 12/2803 348/E7.05 |
| 7,116,894 B1* | 10/2006 | Chatterton | | H04N 5/765 386/211 |
| 7,161,483 B2* | 1/2007 | Chung | | H04L 12/2803 340/12.53 |
| 7,187,279 B2* | 3/2007 | Chung | | G08B 13/19645 340/506 |
| 7,342,536 B2* | 3/2008 | Johnson | | G01S 5/0205 342/442 |
| H2224 H* | 10/2008 | Madden | | 342/424 |
| 7,479,922 B2* | 1/2009 | Hunt | | G01S 1/06 342/357.31 |
| 7,813,698 B2* | 10/2010 | Seshadri | | H04M 1/05 379/114.01 |
| 7,996,496 B2* | 8/2011 | Haartsen | | H04L 67/16 709/218 |
| 7,996,571 B2* | 8/2011 | Salokannel | | G06F 13/385 455/567 |
| 8,150,475 B2* | 4/2012 | Gilmore, II | | H04M 1/6066 455/572 |
| 8,320,832 B2* | 11/2012 | Kang | | H04B 1/20 455/3.01 |
| 8,679,014 B2* | 3/2014 | Bennett | | A61B 1/00016 600/301 |
| 8,744,351 B2* | 6/2014 | Kapur | | H04L 63/0464 455/41.2 |
| 8,766,531 B1* | 7/2014 | Hack | | H01L 51/5036 313/504 |
| 8,793,522 B2* | 7/2014 | Rahman | | G06F 1/08 713/320 |
| 8,849,202 B2* | 9/2014 | Linde | | H04W 80/02 455/41.2 |
| 8,860,570 B2* | 10/2014 | Thomas | | G06F 19/3418 340/539.12 |
| 8,892,175 B2* | 11/2014 | Kirsch | | H04M 1/6091 455/569.2 |
| 8,893,164 B1* | 11/2014 | Teller | | H04N 21/4307 725/12 |
| 8,955,678 B2* | 2/2015 | Murphy | | B23P 19/00 206/320 |
| 8,972,722 B2* | 3/2015 | Faaborg | | G06F 21/00 713/164 |
| 8,976,965 B2* | 3/2015 | Aminzade | | H04L 41/0816 380/258 |
| 9,001,838 B2* | 4/2015 | Ansari | | H04N 21/440218 370/401 |
| 9,100,944 B2* | 8/2015 | Newham | | H04W 76/023 |
| 9,142,214 B2* | 9/2015 | Scalisi | | H04N 5/23206 |
| 9,245,514 B2* | 1/2016 | Donaldson | | G10K 11/16 |
| 9,307,347 B2* | 4/2016 | Reunamaki | | G06F 8/65 |
| 9,367,139 B2* | 6/2016 | Ataee | | G06F 3/017 |
| 9,389,694 B2* | 7/2016 | Ataee | | G06F 3/017 |
| 9,389,698 B2* | 7/2016 | Bouwer | | G06F 3/04883 |
| 9,438,716 B2* | 9/2016 | Davis | | H04M 1/6066 |
| 9,510,083 B2* | 11/2016 | Schobel | | H04W 76/10 |
| 9,545,227 B2* | 1/2017 | Selvaraj | | A61B 5/1121 |
| 9,668,044 B2* | 5/2017 | Schobel | | H04W 76/10 |
| 9,711,060 B1* | 7/2017 | Lusted | | G09B 19/00 |
| 9,712,266 B2* | 7/2017 | Linde | | H04H 20/88 |
| 9,743,219 B2* | 8/2017 | Weiss | | H04W 4/008 |
| 9,904,918 B2* | 2/2018 | Jo | | H04W 76/14 |
| 2003/0158614 A1* | 8/2003 | Friel | | G11B 20/10527 700/94 |
| 2006/0015580 A1* | 1/2006 | Gabriel | | H04N 7/17309 709/219 |
| 2006/0242315 A1* | 10/2006 | Nichols | | H04N 7/17318 709/231 |
| 2007/0005795 A1* | 1/2007 | Gonzalez | | G06F 17/30017 709/232 |
| 2008/0238629 A1* | 10/2008 | Gonikberg | | H04L 1/0002 340/10.4 |
| 2009/0004972 A1* | 1/2009 | Wang | | H04W 16/14 455/63.1 |
| 2009/0124201 A1* | 5/2009 | Meskens | | A61B 5/0028 455/41.2 |
| 2010/0035545 A1* | 2/2010 | Ibrahim | | H04W 24/00 455/41.2 |
| 2010/0120362 A1* | 5/2010 | Walley | | H04W 16/14 455/41.2 |
| 2010/0245585 A1* | 9/2010 | Fisher | | H04M 1/6066 348/164 |
| 2011/0021143 A1* | 1/2011 | Kapur | | H04L 63/0464 455/41.2 |
| 2011/0059769 A1* | 3/2011 | Brunolli | | G08C 17/02 455/556.1 |
| 2011/0181740 A1* | 7/2011 | Watanabe | | G03B 3/10 348/208.2 |
| 2011/0190595 A1* | 8/2011 | Bennett | | A61B 1/00016 600/301 |
| 2012/0119902 A1* | 5/2012 | Patro | | H04L 12/12 340/502 |
| 2012/0196534 A1* | 8/2012 | Kasslin | | H04W 76/40 455/41.2 |
| 2012/0223833 A1* | 9/2012 | Thomas | | G06F 19/3418 340/539.12 |
| 2012/0311187 A1* | 12/2012 | Lv | | H04N 21/43615 709/246 |
| 2013/0090061 A1* | 4/2013 | Linde | | H04W 8/005 455/41.2 |
| 2013/0129103 A1* | 5/2013 | Donaldson | | G10K 11/16 381/71.1 |
| 2013/0202137 A1* | 8/2013 | Edgar | | H04R 25/558 381/315 |
| 2013/0288606 A1* | 10/2013 | Kirsch | | H04M 1/6091 455/41.3 |
| 2013/0314810 A1* | 11/2013 | Sekimoto | | G02B 7/021 359/823 |
| 2013/0326495 A1* | 12/2013 | Reunamaki | | G06F 8/65 717/173 |
| 2014/0019634 A1* | 1/2014 | Srinivasan | | H04L 65/80 709/231 |
| 2014/0068092 A1* | 3/2014 | Cole | | H04W 76/10 709/228 |
| 2014/0140675 A1* | 5/2014 | de Sa | | H04N 21/21805 386/223 |
| 2014/0184881 A1* | 7/2014 | McKinley | | H04N 5/2253 348/345 |
| 2014/0193007 A1* | 7/2014 | Solum | | H04R 25/40 381/313 |
| 2014/0199995 A1* | 7/2014 | Singh | | G06F 13/1663 455/426.1 |
| 2014/0211960 A1* | 7/2014 | Dowdy | | G11B 27/031 381/77 |

(56) References Cited

U.S. PATENT DOCUMENTS

| | | | |
|---|---|---|---|
| 2014/0221862 A1* | 8/2014 | Tambe | A61B 5/0006 600/523 |
| 2014/0222526 A1* | 8/2014 | Shakil | G06Q 50/22 705/7.38 |
| 2014/0242913 A1* | 8/2014 | Pang | H04W 4/008 455/41.3 |
| 2014/0265762 A1* | 9/2014 | Murphy | B23P 19/00 312/223.1 |
| 2014/0337621 A1* | 11/2014 | Nakhimov | G06F 1/163 713/168 |
| 2014/0342671 A1* | 11/2014 | Kim | H04W 4/02 455/41.3 |
| 2014/0348327 A1* | 11/2014 | Linde | H04H 20/88 381/2 |
| 2014/0368336 A1* | 12/2014 | Felix | H04W 4/90 340/539.13 |
| 2014/0375828 A1* | 12/2014 | Miller | H04N 1/00289 348/207.11 |
| 2014/0379336 A1* | 12/2014 | Bhatnagar | H04R 1/1091 704/235 |
| 2015/0022346 A1* | 1/2015 | Fadell | G05B 11/01 340/533 |
| 2015/0024804 A1* | 1/2015 | Davis | H04M 1/6066 455/569.1 |
| 2015/0032812 A1* | 1/2015 | Dudley | H04N 21/42203 709/204 |
| 2015/0042447 A1* | 2/2015 | Vogt | G08C 23/04 340/4.41 |
| 2015/0065052 A1* | 3/2015 | Heo | H04W 4/008 455/41.2 |
| 2015/0065055 A1* | 3/2015 | Newham | H04W 76/023 455/41.3 |
| 2015/0065893 A1* | 3/2015 | Ye | A61B 5/6898 600/483 |
| 2015/0092084 A1* | 4/2015 | Lee | H04N 5/2256 348/234 |
| 2015/0099946 A1* | 4/2015 | Sahin | A61B 5/16 600/301 |
| 2015/0100890 A1* | 4/2015 | Kosmiskas | G06F 3/0484 715/744 |
| 2015/0100991 A1* | 4/2015 | Risberg | H04L 67/104 725/80 |
| 2015/0109202 A1* | 4/2015 | Ataee | G06F 3/017 345/156 |
| 2015/0113062 A1* | 4/2015 | Oh | H04W 4/70 709/204 |
| 2015/0120913 A1* | 4/2015 | Hartley | H04L 43/16 709/224 |
| 2015/0141096 A1* | 5/2015 | Murphy | B23P 19/00 455/575.8 |
| 2015/0161099 A1* | 6/2015 | Lee | G06F 9/454 345/171 |
| 2015/0164410 A1* | 6/2015 | Selvaraj | A61B 5/1121 600/509 |
| 2015/0164411 A1* | 6/2015 | Selvaraj | A61B 5/1121 600/301 |
| 2015/0169074 A1* | 6/2015 | Ataee | G06F 3/017 345/156 |
| 2015/0172538 A1* | 6/2015 | Nordstrom | H04N 5/2252 348/207.1 |
| 2015/0188971 A1* | 7/2015 | Yoon | H04L 67/20 709/219 |
| 2015/0189425 A1* | 7/2015 | Pang | H04M 1/6041 381/77 |
| 2015/0189426 A1* | 7/2015 | Pang | H04M 1/21 381/77 |
| 2015/0223731 A1* | 8/2015 | Sahin | A61B 5/16 600/301 |
| 2015/0256581 A1* | 9/2015 | Kolhi | H04L 65/602 709/219 |
| 2015/0264425 A1* | 9/2015 | Heinz, II | H04N 21/4318 386/223 |
| 2015/0287403 A1* | 10/2015 | Holzer Zaslansky | G06T 13/205 704/231 |
| 2015/0312623 A1* | 10/2015 | Li | H04N 21/472 725/32 |
| 2015/0312858 A1* | 10/2015 | Kerai | H04W 52/0212 370/311 |
| 2015/0313294 A1* | 11/2015 | Yue | A41D 13/0053 2/69 |
| 2015/0319557 A1* | 11/2015 | El-Hoiydi | H04W 4/008 455/41.2 |
| 2015/0323791 A1* | 11/2015 | Scheer | G06F 3/0488 345/173 |
| 2015/0334488 A1* | 11/2015 | Kim | H04W 4/06 381/2 |
| 2015/0334657 A1* | 11/2015 | Newham | H04W 76/023 455/41.2 |
| 2015/0350766 A1* | 12/2015 | Schobel | H04W 76/10 381/77 |
| 2015/0358768 A1* | 12/2015 | Luna | H04W 4/02 455/456.1 |
| 2015/0365208 A1* | 12/2015 | Hyun | H04W 4/80 370/310 |
| 2015/0371529 A1* | 12/2015 | Dolecki | G08C 17/02 700/94 |
| 2015/0381706 A1* | 12/2015 | Wohlert | H04L 67/10 709/201 |
| 2016/0013872 A1* | 1/2016 | Strand | H04B 13/005 455/41.2 |
| 2016/0037055 A1* | 2/2016 | Waddington | H04N 5/23216 348/211.8 |
| 2016/0048366 A1* | 2/2016 | Cowin | G06F 3/1423 345/1.1 |
| 2016/0051192 A1* | 2/2016 | Kang | A61B 5/002 600/364 |
| 2016/0070963 A1* | 3/2016 | Chakraborty | G06K 9/6271 386/241 |
| 2016/0072855 A1* | 3/2016 | Palin | H04L 65/1069 709/219 |
| 2016/0080173 A1* | 3/2016 | Quick | H04L 25/02 705/7.31 |
| 2016/0088572 A1* | 3/2016 | Bi | H04W 52/241 455/41.2 |
| 2016/0100276 A1* | 4/2016 | Viswanadham | H04W 4/80 455/41.2 |
| 2016/0114887 A1* | 4/2016 | Zhou | B60F 5/02 348/148 |
| 2016/0129182 A1* | 5/2016 | Schuster | A61M 5/16831 702/56 |
| 2016/0165380 A1* | 6/2016 | Kwan | H04W 4/008 455/41.1 |
| 2016/0189453 A1* | 6/2016 | Johnson | G07C 9/00007 340/5.61 |
| 2016/0192115 A1* | 6/2016 | Weiss | H04W 4/008 455/41.2 |
| 2016/0198238 A1* | 7/2016 | Hajiyev | H04N 21/42201 725/12 |
| 2016/0231325 A1* | 8/2016 | Kang | A61B 5/150022 |
| 2016/0302060 A1* | 10/2016 | Agardh | H04L 67/16 |
| 2016/0378429 A1* | 12/2016 | Dolecki | G08C 17/02 700/94 |
| 2017/0078786 A1* | 3/2017 | Schobel | H04W 76/10 |
| 2017/0095693 A1* | 4/2017 | Chang | G09B 5/02 |
| 2017/0142529 A1* | 5/2017 | Ingemarsson | H04R 25/554 |
| 2017/0154326 A1* | 6/2017 | Jo | G06Q 20/3278 |
| 2017/0245047 A1* | 8/2017 | Schobel | H04R 1/1091 |
| 2017/0289712 A1* | 10/2017 | Feilner | H04R 25/558 |
| 2018/0048750 A1* | 2/2018 | Hardi | G06F 3/016 |

OTHER PUBLICATIONS

"Non-Final Office Action", U.S. Appl. No. 14/626,713, dated Apr. 11, 2016, 7 pages.

"Non-Final Office Action", U.S. Appl. No. 14/626,713, dated Aug. 10, 2016, 8 pages.

(56) References Cited

OTHER PUBLICATIONS

"Notice of Allowance", U.S. Appl. No. 14/626,713, dated Apr. 20, 2017, 7 pages.

* cited by examiner

LOW-POWER WIRELESS CONTENT COMMUNICATION BETWEEN DEVICES

PRIORITY APPLICATION

This Application is a continuation of U.S. patent application Ser. No. 14/626,713, filed Dec. 19, 2015, entitled "Low-power Wireless Content Communication between Devices," which claims priority under 35 U.S.C. Section 119(e) to U.S. Provisional Application 62/097,478, filed Dec. 29, 2014, and titled "Low-power Wireless Content Communication between Devices," the entire disclosures of which are hereby incorporated by reference.

BACKGROUND

The popularity of wearable devices has continued to increase as the amount of functionality made available via these devices has increased. Additionally, this popularity has also followed increases in the portability of the devices. However, these factors often conflict with each other.

For example, an increase in bandwidth supported by the wearable device to transfer data has a corresponding increase in an amount of power consumed by the wearable device, thereby limiting portability of the device due to frequent recharging of the device. Consequently, functionality available via the wearable device is often limited by these factors, which also limits desirability of consumers in purchasing the device due to the tradeoffs required in portability and functionality under conventional techniques.

SUMMARY

Low-power wireless content communication techniques between devices are described. In one or more implementations, a method is described of controlling transfer of content to a wearable device from one or more computing devices over a lower power wireless communication connection. The method includes initiating a transfer of content to the wearable device over the lower power wireless communication connection to support playback of the content at the wearable device, in which the low power wireless communication connection does not support streaming of the content in an amount sufficient to support real time playback of the content at the wearable device. The transfer is managed of a plurality of portions of the content to the wearable device over the lower power wireless communication connection in which individual ones of the plurality of portions are transferred from the one or more computing device responsive to availability of the lower power wireless communication connection with the one or more computing devices. The plurality of portions of the content are caused to be stored locally at the wearable device.

In one or more implementations, a wearable device includes a housing configured to be worn by a user, an output device to output content that is secured to the housing, and a low power wireless communication device disposed within the housing. The low power wireless communication device is configured to form a low power wireless communication connection with one or more computing devices that does not support streaming of the content in an amount sufficient to support real time playback of the content by the output device. One or more modules are disposed within the housing and configured to manage transfer of a plurality of portions of the content to the wearable device over the lower power wireless communication connection in which individual ones of the plurality of portions are transferred from the one or more computing devices.

In one or more implementations, a system includes a wearable device having a low power wireless communication device configured to form a low power wireless communication connection that does not support streaming of audio in an amount sufficient to support real time playback of the audio by an output device of the wearable device. The system also includes a computing device communicatively coupled to the wearable device using the low power wireless connection and having the audio stored thereon. In this system, at least one of the wearable device or the computing device are configured to control transfer of a plurality of portions of the audio to the wearable device over the lower power wireless communication connection responsive to availability of the lower power wireless communication connection.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Wearable devices are typically limited by the desired portability of the device, even more so than other portable computing devices such as mobile phones and tablets.

Accordingly, wearable devices may be limited by an amount of power available from a battery as well as by devices that consume this power, such as processing systems, memory, display devices, wireless communication devices, and so forth. For example, conventional low power wireless communication techniques do not support transmission of large items of content, such as audio or video to conserve battery resources.

Low-power wireless content communication techniques are described. In one or more implementations, content such as audio or video is communicated to a wearable device over a low-power connection that does not have sufficient bandwidth to support real-time output by the wearable device. Examples of low-power wireless content communication include Bluetooth® Low Energy, Wi-Fi Low Energy, 2.4 GHz wireless protocols, and so on. In order to accomplish this, transfer of portions of the content is managed to send the portions when the wireless connection is available, e.g., in range of a computing device having one or more of the portions.

Management may also include use of different computing devices, such as devices associated with a user's account as part of a network service such that different devices send different portions of the content when available. This management is performable by the wearable device, the computing devices, and/or a service backend. In this way, small, low power wearable devices are provided with content that otherwise is not available to the devices over a wireless connection, thereby promoting portability of the device. Further discussion of these and other examples are described in the following sections and shown in corresponding figures.

In the following discussion, an example environment is first described that may employ the low-power wireless content communication techniques described herein. Example procedures are then described which may be performed in the example environment as well as other environments. Consequently, performance of the example procedures is not limited to the example environment and the example environment is not limited to performance of the example procedures.

Example Environment

Figure 1:
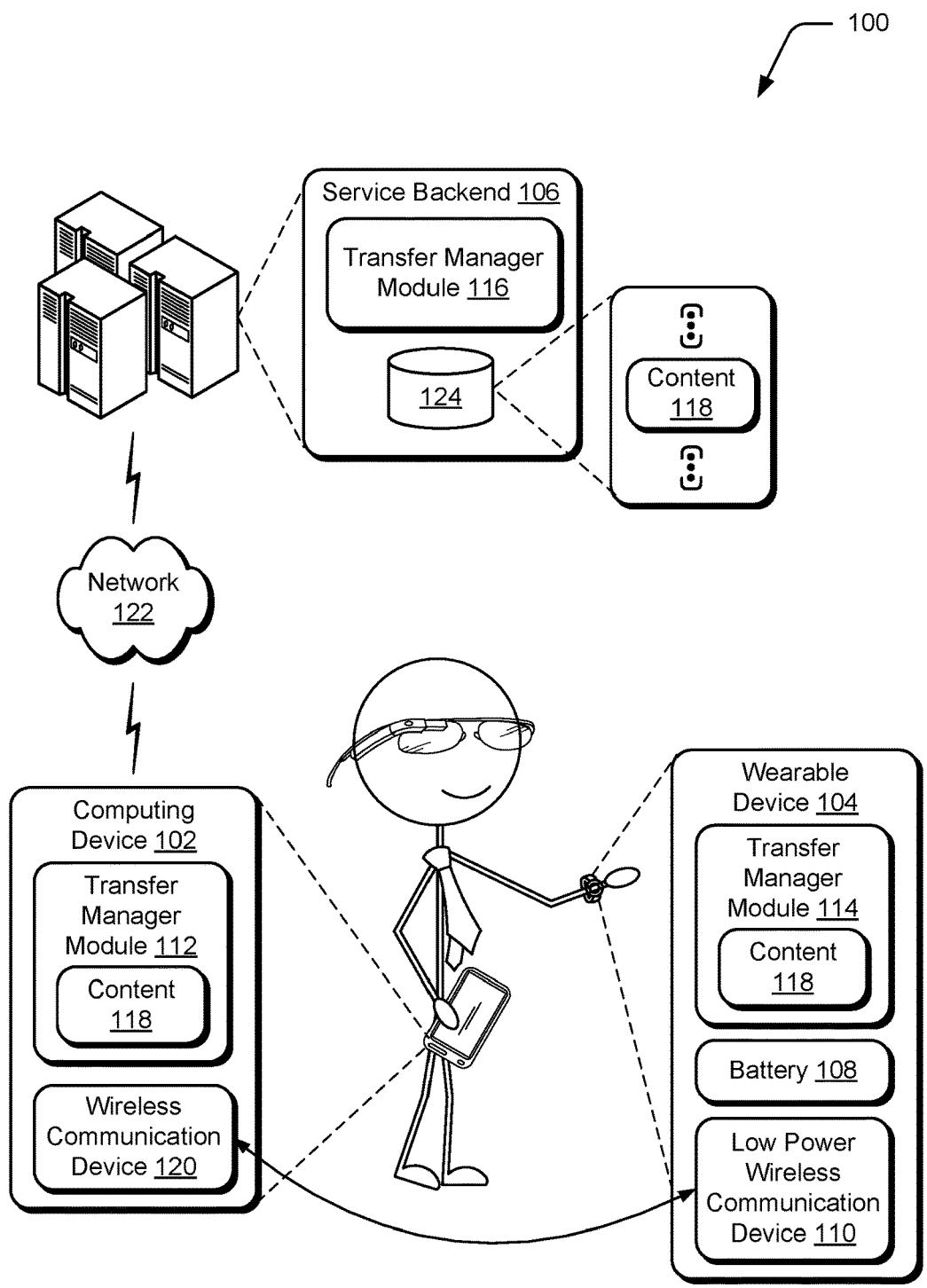
FIG. 1 is an illustration of an environment in an example implementation that is operable to employ low-power wireless communication techniques described herein.

FIG. 1 is an illustration of an environment 100 in an example implementation that is operable to employ low-power wireless content communication techniques described herein. The illustrated environment 100 includes a computing device 102, a wearable device 104, and a service backend 106. Computing devices that implement these entities are configurable in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Likewise, computing devices that implement the service backend 106 are also configurable in a variety of ways, such as multiple servers of one or more server farms as illustrated. Additionally, although single computing device examples are shown, a computing device may be representative of a plurality of different devices as further described in relation to FIG. 6.

The wearable device 104 has a housing that is configured to be worn by a user. As such, the housing of the wearable device 104 may take a variety of different forms, such as a ring, broach, pendant, configured to be worn on a wrist of a user as illustrated, glasses as also illustrated, and so forth. The wearable device 104 includes a battery 108 and a low-power wireless communication device 110 that are disposed within the housing.

The low-power wireless communication device 110 is configured to support wireless communication that consumes a low amount of power of the battery 108. As such, however, protocols used by the low-power wireless communication device 110 have limited bandwidth. As a result, these protocols do not support streaming of the content in an amount that is sufficient to support real time playback of the content at the wearable device, e.g., of audio or video by output devices such as speakers or a display device of the wearable device 104.

Accordingly, the computing device 102, the wearable device 104, and service backend 106 are illustrated as including respective transfer manager modules 112, 114, 116. The transfer manager modules 112, 114, 116 are representative of functionality to manage transfer of content 118 (e.g., audio or video) to the wearable device 104 for local storage on the wearable device 104. In this way, the wearable device 104 may still conserve power of the battery 108 yet have access to expanded functionality through playback of the content 118 that was not otherwise accessible wirelessly by the wearable device 104.

This management is performable singly or in combination by one or more of the transfer manager modules 112, 114, 116. Transfer manager module 114 of the wearable device 104, for instance, may ping the computing device 102 over a wireless connection formed between the low power wireless communication device 110 and a wireless communication device 120 of the computing device 102 to obtain the content 118. In this way, the transfer manager module 114 of the wearable device 104 controls the transfer of the content 118 in this instance.

In another instance, the transfer manager module 112 controls the transfer of the content 118 to the wearable device 104, such as to send portions of the content 118 when the wearable device 104 is in range of the lower power wireless connection. This may be performed to control transfer of the content 116 using a single computing device 102 as shown in FIG. 2 and may even employ a plurality of computing devices as shown in FIG. 3.

The transfer manager module 116 of a service backend 106 may also be employed to control the transfer of content 118. The service backend 106, for instance, includes one or more services that are accessible to a user of the computing device 102 via a network 122. The services include storage 124 of content 118 that is provided to the computing device 102 via the network 102, roaming of user settings associated with a user's account, social network services, and so on. Accordingly, login to the services may be performed to access content 118 that is to be consumed by the computing device 102 and/or the wearable device 104 via a user's account. Further, the transfer manager module 116 of the service backend 106 is configurable to control how the content 118 is transferred to the wearable device 104, such as to select which computing device 102 to employ and so forth, an example of which is shown and described in relation to FIG. 4.

In the illustrated example, due to limitations of the low power wireless communication device 110 the service backend 106 is not directly accessible to the wearable device 104, but is directly accessible to the computing device 102, e.g., via the Internet. As such, content 118 is communicated from the service backend 106 to the computing device 102 via the network 122, and then over a low power wireless connection illustrated through use of an arrow between the computing device 102 and the wearable device 104 in this example. Other examples are also contemplated without departing from the spirit and scope thereof. Further discussion of low-power wireless content communication techniques is described in the following and shown in corresponding figures.

Figure 2:
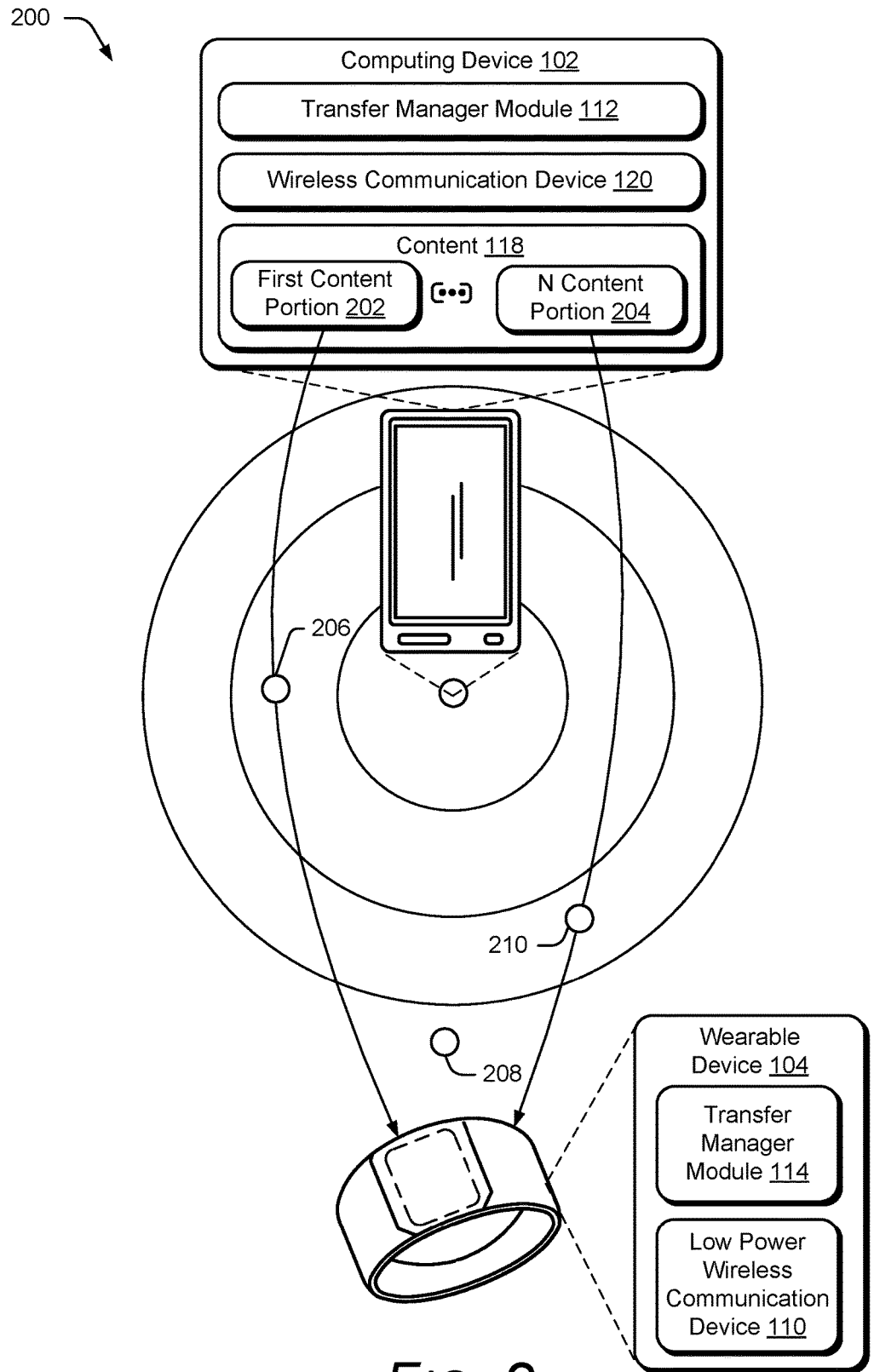
FIG. 2 depicts a system in an example implementation in which control of transfer of content over a low power wireless connection is managed responsive to availability of the connection.
Figure 3:
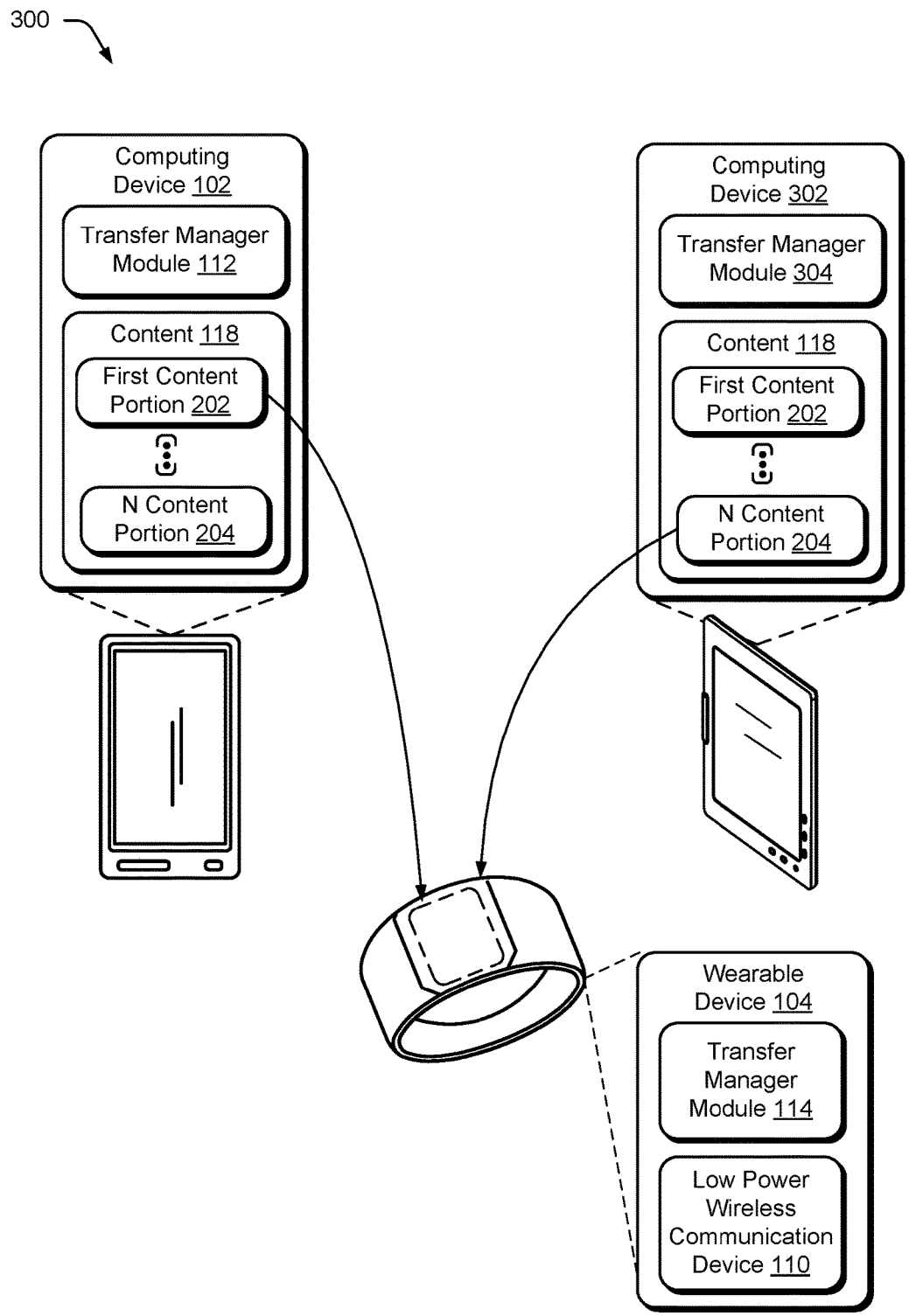
FIG. 3 depicts a system in an example implementation in which control of transfer of content over a low power wireless connection is managed using a plurality of computing devices to transfer the content.

FIG. 2 depicts a system 200 in an example implementation in which control of transfer of content over a low power wireless connection is managed responsive to availability of the connection. The system includes the computing device 102 and the wearable device 104 of FIG. 1. In this example, the content 118 is divided into a plurality of portions, examples of which are illustrated as a first content portion 202 to an N content portion 204. These portions are transferred in this example responsive to a detection of availability of the low power wireless communication connection between the computing device 102 and the wearable device 104.

For example, the computing device 102 is illustrated as included at a center of four concentric circles that illustrate a wireless range supported by the low power wireless communication connection. Accordingly, when the wearable device 104 is disposed at a location 206 that is within this range, the first content portion 202 of the content 118 is transferred to the wearable device 104 as illustrated by the arrow in the figure.

However, this transfer ceases when the wearable device 104 is disposed at a location 208 that is outside this range, and then resumes when the wearable device 104 is disposed at a location 210 back within the range of the connection as also illustrated by inclusion of an arrow or lack thereof in the figure. In this way, the different portions of the content 118 (e.g., first content portion 202 through N content portion 204) are provided automatically and without user intervention based on availability of the connection.

This transfer, as previously described, is manageable in a variety of ways. The transfer manager module 114 of the wearable device 104, for instance, may form requests for portions of the content 118, e.g., may "ping" the computing device 102. Thus, when the computing device 102 is in range, the transfer manager module 112 of the computing device 102 sends one or more of the portions of the content 118 over the lower power wireless communication connection. In one or more implementations, the transfer manager module 114 requests specific portions of the content 118, such as to request the N content portion 204 due to a previous transfer of the first content portion 202.

In another instance, the transfer manager module 112 of the computing device 102 detects availability of the wearable device 104 via the low power wireless communication connection and controls the transfer of the first through N content portions 202, 204. Therefore, the transfer of the portions of the content 118 is controllable by the computing device 102 or the wearable device 104 and thus expands functionality available via the wearable device 104, such as to function as a personal assistant through playback of audio that includes reminders, notifications, and so forth. The transfer may also be performed using a plurality of computing devices, an example of which is described in the following and is shown in a corresponding figure.

FIG. 3 depicts a system 300 in an example implementation in which control of transfer of content over a low power wireless connection is managed using a plurality of computing devices to transfer the content. This system 300 includes the computing device 102 and the wearable device 104 of FIG. 2 as having respective transfer manager modules 112, 114, and the computing device 102 including content 118 having first through N content portions 202, 204.

The system 300 also includes another computing device 302 having a transfer manager module 304 and the content 118 having first through N content portions 202, 204. In this example, the wearable device 104 receives portions of the content that are transferred using different computing devices. A user, for instance, may have access to both computing devices 102, 302, such as associated with a user account maintained by the service backend 106 of FIG. 1. Accordingly, the transfer manager modules 112, 114, 304 are configured in this instance to leverage different availabilities of low power wireless communication connections between the computing devices 102, 302, and the wearable device 104.

The user, for instance, wears the wearable device 104 at a home where computing device 102 is available to transfer the first content portion 202. The user then leaves for work, which causes the transfer to cease. Once at work, computing device 302 is available to complete the transfer of the content 118 through communication of the N content portion 204. As before, this management is controllable by the transfer manager module 114 of the wearable device 104 (e.g., to request particular portions of the content 118), by the transfer manager modules 112, 304 of the computing devices 102, 302, or a combination of the two. Control of the transfer is also performable by the service backend 106, an example of which is described in the following and shown in a corresponding figure.

Figure 4:
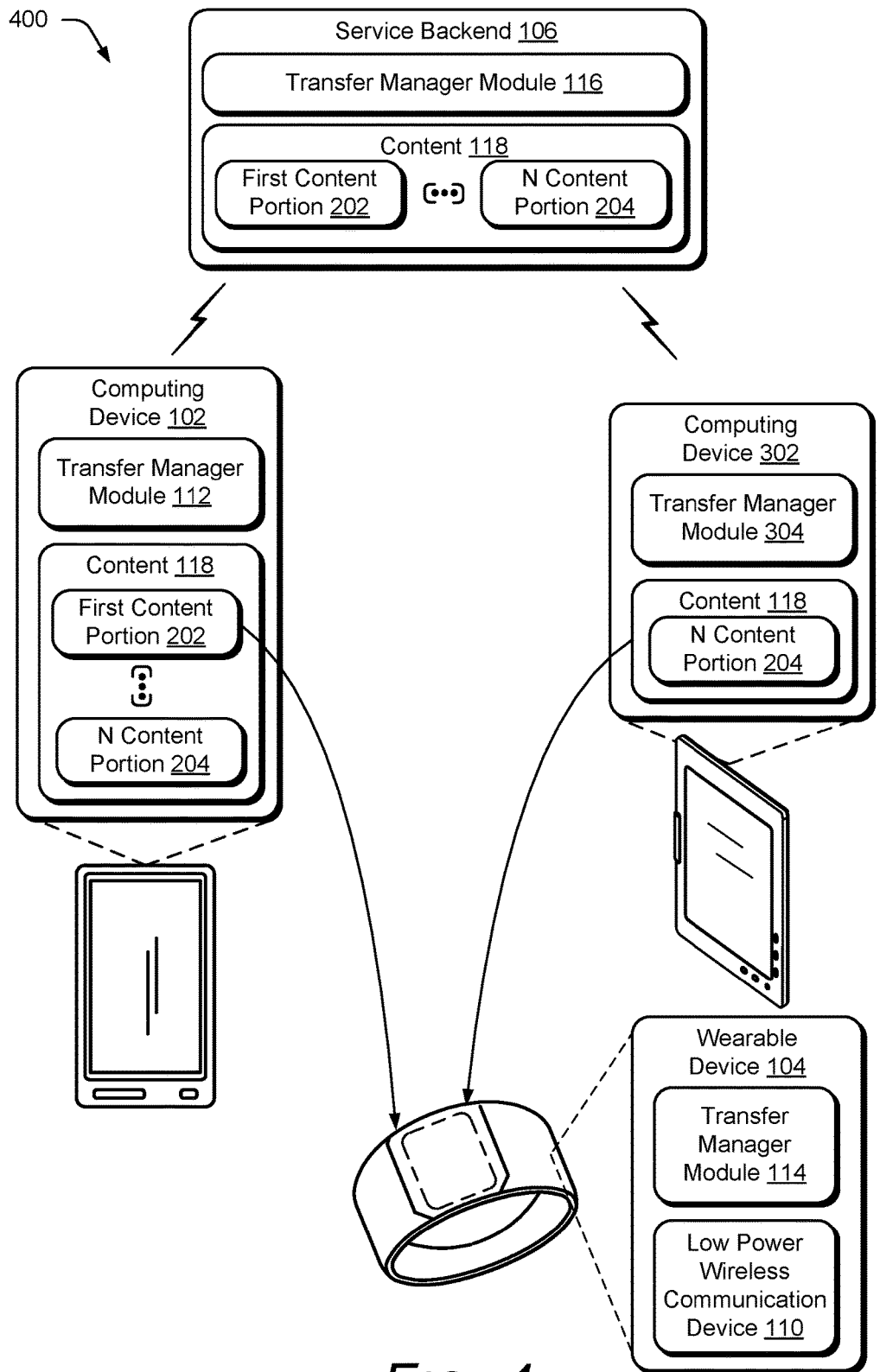
FIG. 4 depicts a system in an example implementation in which control of transfer of content over a low power wireless connection is managed by a service backend of FIG. 1.

FIG. 4 depicts a system 400 in an example implementation in which control of transfer of content over a low power wireless connection is managed by a service backend of FIG. 1. This example follows the previous example in which a plurality of computing devices 102, 302 are used to transfer content 118 to the wearable device 104. In this example, however, control of this transfer is managed by a service backend 106.

The service backend 106, for instance, may monitor user login to a user's account through computing device 302, such as part of a social network service, to roam user settings, e.g., user preferences, and so on. As part of this login, the transfer manager module 116 detects that the wearable device 104 is communicatively coupled to the computing device 302. The transfer manager module 116 in this instance continues transfer of the content 118, such as to communicate N content portion 204 to the computing device 302 for communication to the wearable device 104 to supplement a previously communicated first content portion 202 from computing device 102.

Thus, the service backend 106 in this case distributes the first through N content portions 202, 204 to computing devices 102, 302 to cause transfer to the wearable device 104. A pull model is also contemplated in which the wearable device 104 pings the computing device 302 to obtain the N content portion 204 identified in a request formed by the wearable device 104.

As described above, the transfer manager modules 112, 114, 116 are configurable to support a variety of different low energy wireless protocols that save power yet still support transfer of content 118 such as audio and video. This is usable to expand functionality available via small, low-power wearable devices 104, such to function as a personal assistant. Further discussion of these are other examples is described in relation to the following procedure.

Example Procedures

The following discussion describes low-power wireless content communication techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
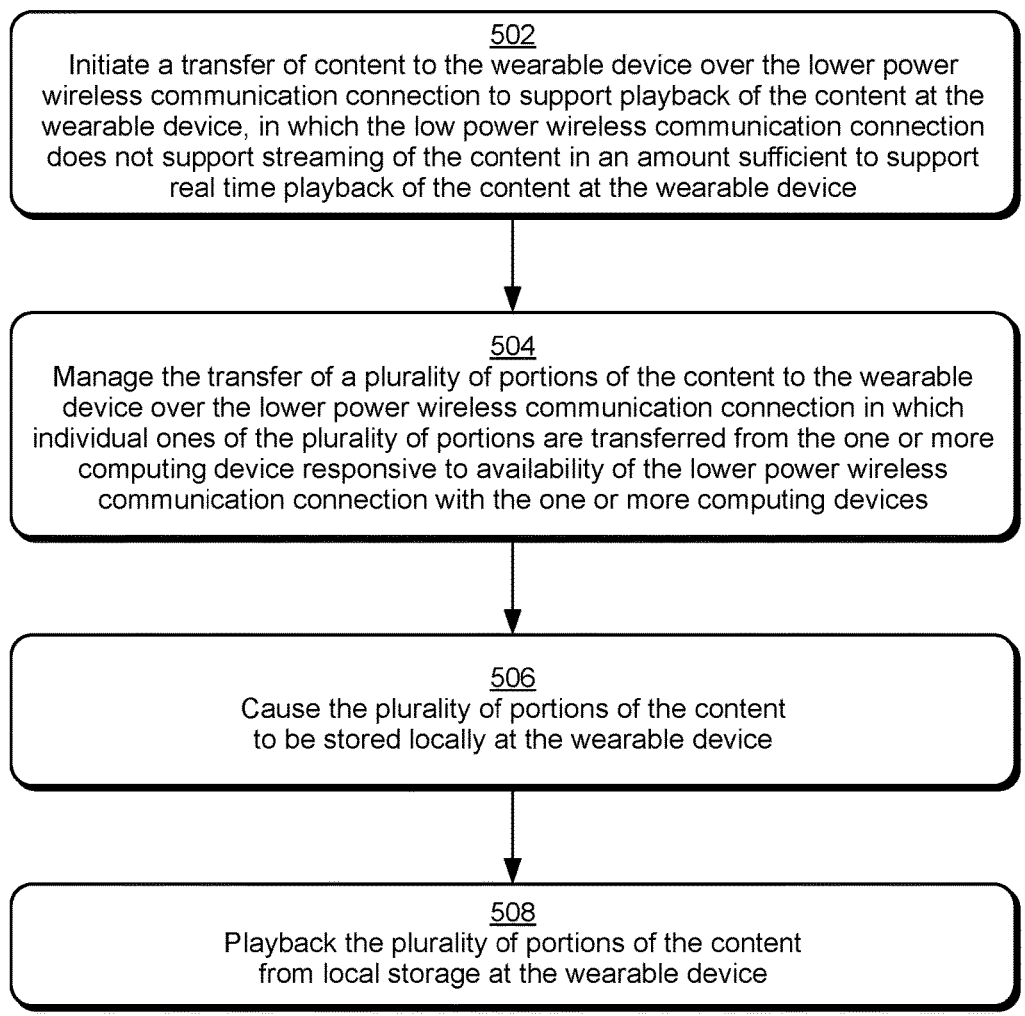
FIG. 5 is a flow diagram depicting a procedure in an example implementation in which transfer is managed of portions of content over a low power wireless communication connection.

FIG. 5 depicts a procedure 500 in an example implementation in which transfer is managed of portions of content over a low power wireless communication connection. A transfer of content to the wearable device is initiated over the lower power wireless communication connection to support playback of the content at the wearable device, in which the low power wireless communication connection does not support streaming of the content in an amount sufficient to support real time playback of the content at the wearable device (block 502). As previously described, the transfer may be initiated by the computing device 102, the wearable device 104, and even a service backend 106.

The transfer is managed of a plurality of portions of the content to the wearable device over the lower power wireless communication connection in which individual ones of the plurality of portions are transferred from the one or more computing device responsive to availability of the lower power wireless communication connection with the one or more computing devices (block 504). This availability may be based on whether the wearable device 104 is within range of the low power wireless communication connection with the computing device 102, which devices are available to perform the transfer as shown in FIG. 3, and so forth.

The plurality of portions of the content are caused to be stored locally at the wearable device (block 506). The transfer manager modules 112, 114, 116, for instance, are configured to cause transfer of first through N content portions 202, 204 of the content 118 such that the wearable device 104 is configured to store the content 118 locally on the device, e.g., in memory. Playback is performed of the plurality of portions of the content from the storage (block 508). Playback, for instance, may be configured by the content to occur responsive to an event (e.g., a reminder), when initiated by a user (e.g., playback of a desired song), and so forth.

Example Electronic Device

Figure 6:
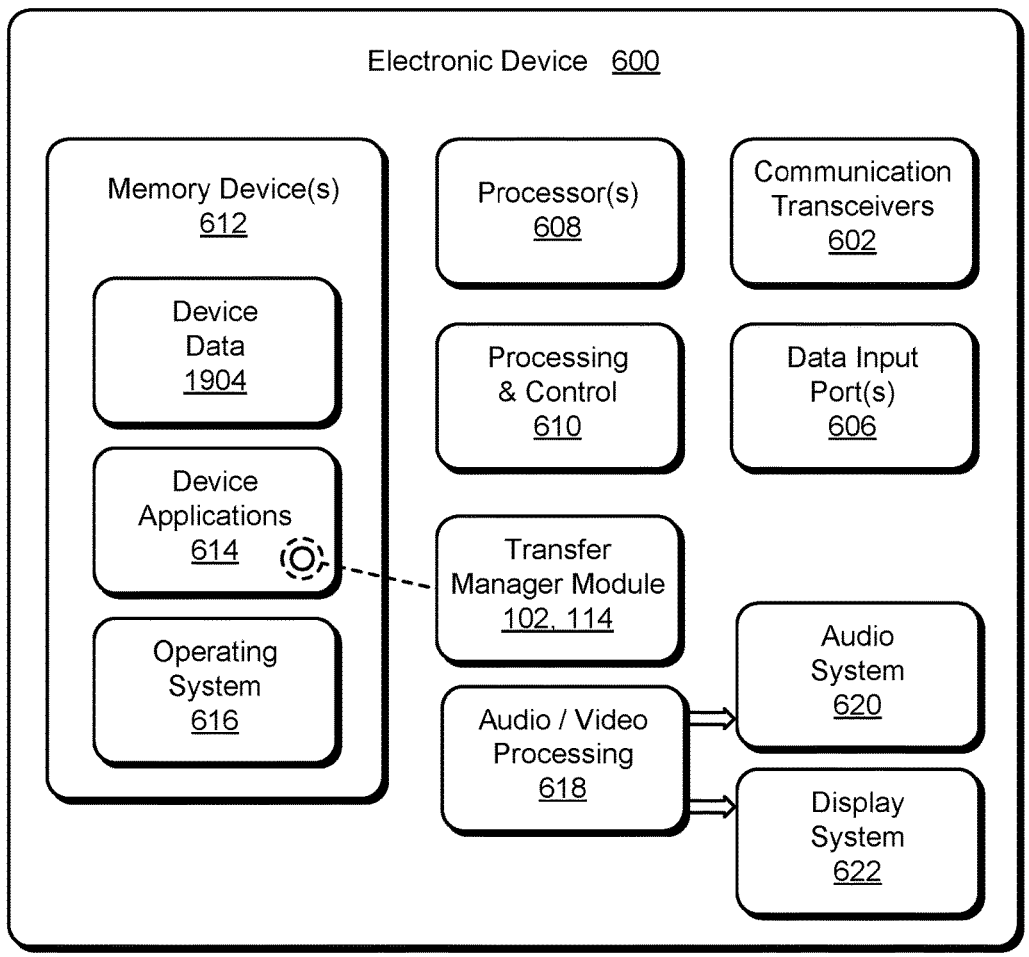
FIG. 6 illustrates an example system including various components of an example device that can be implemented as any type of computing device as described and/or utilize with reference to FIGS. 1-5 to implement embodiments of the techniques described herein.

FIG. 6 illustrates various components of an example electronic device 600 that can be implemented as a wearable haptic and touch communication device, a wearable haptic device, a non-wearable computing device having a touch-sensitive display, and/or a remote computing device as described with reference to any of the previous FIGS. 1-5. The device may be implemented as one or combination of a fixed or mobile device, in any form of a consumer, computer, portable, user, communication, phone, navigation, gaming, audio, messaging, Web browsing, paging, media playback, and/or other type of electronic device, such as the wearable device 104 described with reference to FIG. 1.

Electronic device 600 includes communication transceivers 602 that enable wired and/or wireless communication of device data 604, such as received data over a low power wireless protocol. Other example communication transceivers include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (Wi-MAX™) standards, and wired local area network (LAN) Ethernet transceivers.

Electronic device 600 may also include one or more data input ports 606 via which any type of data, media content, and/or inputs can be received, such as user-selectable inputs, messages, music, television content, recorded video content, and any other type of audio, video, and/or image data received from any content and/or data source. Data input ports 606 include USB ports, coaxial cable ports, and other serial or parallel connectors (including internal connectors) for flash memory, DVDs, CDs, and the like. These data input ports may be used to couple the electronic device to components, peripherals, or accessories such as keyboards, microphones, or cameras.

Electronic device 600 of this example includes processor system 608 (e.g., any of application processors, microprocessors, digital-signal-processors, controllers, and the like), or a processor and memory system (e.g., implemented in a SoC), which process (i.e., execute) computer-executable instructions to control operation of the device. Processor system 608 (processor(s) 608) may be implemented as an application processor, embedded controller, microcontroller, and the like. A processing system may be implemented at least partially in hardware, which can include components of an integrated circuit or on-chip system, digital-signal processor (DSP), application-specific integrated circuit (ASIC), field-programmable gate array (FPGA), a complex programmable logic device (CPLD), and other implementations in silicon and/or other hardware. Alternatively or in addition, the electronic device can be implemented with any one or combination of software, hardware, firmware, or fixed logic circuitry that is implemented in connection with processing and control circuits, which are generally identified at 610 (processing and control 610). Although not shown, electronic device 600 can include a system bus, crossbar, or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Electronic device 600 also includes one or more memory devices 612 that enable data storage, examples of which include random access memory (RAM), non-volatile memory (e.g., read-only memory (ROM), flash memory, EPROM, EEPROM, etc.), and a disk storage device. Memory device(s) 612 provide data storage mechanisms to store the device data 604, other types of information and/or data, and various device applications 614 (e.g., software applications). For example, operating system 616 can be maintained as software instructions within memory device 612 and executed by processors 608.

Electronic device 600 also includes audio and/or video processing system 618 that processes audio data and/or passes through the audio and video data to audio system 620 and/or to display system 622 (e.g., spectacles, displays on computing bracelet as shown in FIG. 1, and so on) to output content 118. Audio system 620 and/or display system 622 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link. In some implementations, audio system 620 and/or display system 622 are external components to electronic device 600. Alternatively or additionally, display system 622 can be an integrated component of the example electronic device, such as part of an integrated touch interface.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A device for controlling transfer of content over a low power wireless communication connection, the device comprising:
  a transfer manager module configured to:
    initiate a transfer of content to a wearable device over the low power wireless communication connection to support playback of the content at the wearable device, the low power wireless communication connection not having sufficient bandwidth to support streaming of the content in an amount sufficient to support real time playback of the content at the wearable device;
    manage the transfer of a plurality of portions of the content to the wearable device over the low power wireless communication connection in which individual ones of the plurality of portions are transferred from one or more computing devices responsive to availability of the low power wireless communication connection with the one or more computing devices; and
    cause the plurality of portions of the content to be stored locally at the wearable device.

2. A device as described in claim 1, wherein the low power wireless communication connection complies with a Bluetooth Low Energy Protocol, a Wi-Fi Low Energy Protocol, or a 2.4 GHz wireless protocol.

3. A device as described in claim 1, wherein the device comprises the wearable device.

4. A device as described in claim 3, wherein the transfer manager module of the wearable device is further configured to manage the transfer by:
  identifying the one or more computing devices as part of a request for the content; and
  requesting the transfer of the individual ones of the plurality of portions of the content from the identified one or more computing devices.

5. A device as described in claim 4, wherein:
  the plurality of portions of the content includes a first portion and a second portion;
  the one or more computing devices include a first computing device and a second computing device; and
  the transfer manager module is further configured to obtain the first portion from the first computing device and the second portion from the second computing device using a low power wireless communication device of the wearable device.

6. A device as described in claim 3, wherein the wearable device is configured to be worn on a wrist or as a broach, a necklace, or a ring.

7. A device as described in claim 1, wherein the transfer manager module is further configured to manage the transfer at least partly through use of a service backend that controls which of the plurality of portions are transferred by which of the one or more computing devices.

8. A device as described in claim 7, wherein the service backend is not directly accessible by the wearable device over a network connection, and the service backend is directly accessible by the one or more computing devices.

9. A device as described in claim 1, wherein the device comprises a computing device of the one or more computing devices.

10. A device as described in claim 9, wherein the transfer manager module of the computing device is configured to obtain at least one portion of the plurality of portions of the content from a service backend.

11. A device as described in claim 9, wherein the transfer manager module of the computing device is configured to control which of the plurality of portions of the content are transferred to the wearable device by which of the one or more computing devices.

12. A method of controlling transfer of content to a wearable device from one or more computing devices over a low power wireless communication connection, the method comprising:
  forming the low power wireless communication connection between the one or more computing devices and the wearable device, the wearable device including a housing configured to be worn by a user, the low power wireless communication connection incapable of supporting a streaming of the content in an amount sufficient to support real time playback of the content by an output device secured to the housing of the wearable device;
  managing transfer of a plurality of portions of the content to the wearable device over the low power wireless communication connection in which individual ones of the plurality of portions are transferred from the one or more computing devices; and
  ceasing the transfer responsive to a determination that the wearable device is outside a range of the one or more computing devices.

13. A method as described in claim 12, wherein the managing comprises:
  identifying, by the wearable device, at least one computing device of the one or more computing devices from which content is to be obtained; and
  requesting the transfer of the individual ones of the plurality of portions of the content from the identified computing device.

14. A method as described in claim 12, wherein:
  the managing comprises receiving, by the wearable device, the plurality of portions of the content from the one or more computing devices via the low power wireless communication connection; and
  the housing is configured to be worn on a wrist or as a broach, a necklace, or a ring.

15. A method as described in claim 12, wherein:
  the managing comprises transferring, by a computing device of the one or more computing devices, at least one portion of the plurality of portions of the content to the wearable device via the low power wireless communication connection; and
  the content comprises at least one of audio media or video media.

16. A method as described in claim 12, further comprising:
   causing the plurality of portions of the content to be placed in a local storage at the wearable device; and
   playing back the plurality of portions of the content from the local storage of the wearable device.

17. A system comprising:
   a memory device configured to store a plurality of portions of content; and
   a transfer manager module configured to:
      support a transfer of the plurality of portions of the content between one or more computing devices and a wearable device via a low power wireless communication connection that does not support streaming of the content in an amount sufficient to support real time playback of the content by the wearable device; and
      manage how at least one of the wearable device or the one or more computing devices is configured to control the transfer of the plurality of portions of the content to the wearable device over the low power wireless communication connection responsive to availability of the low power wireless communication connection as determined by detection of a user login through the one or more computing devices.

18. A system as described in claim 17, wherein the transfer manager module is configured to provide the plurality of portions of the content to the one or more computing devices via at least one network.

19. A system as described in claim 17, wherein the low power wireless communication connection complies with a Bluetooth Low Energy Protocol, a Wi-Fi Low Energy Protocol, or a 2.4 GHz wireless protocol.

20. A system as described in claim 17, wherein the transfer manager module is further configured to enable the wearable device to control the transfer by requesting the transfer of individual ones of the plurality of portions of the content from the one or more computing devices that have been associated with the user login.

* * * * *